Sept. 5, 1961  S. W. LEWINTER  2,999,236
HIGH RESOLUTION RADAR
Filed July 18, 1958  3 Sheets-Sheet 2

Inventor
SIDNEY W. LEWINTER
By Philip M. Bolton
Attorney

Fig. 5
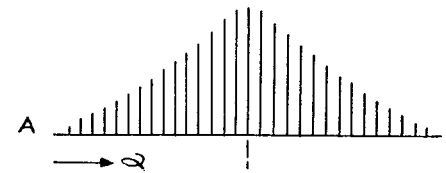
A
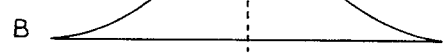
B
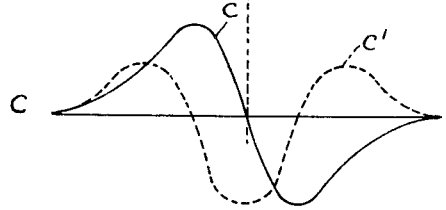
C
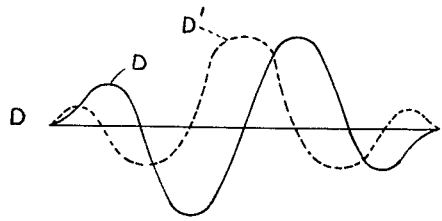
D
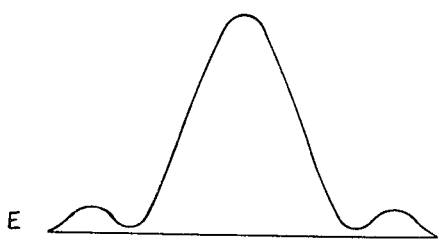
E
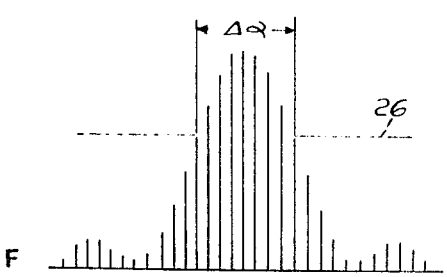
F
Fig. 6
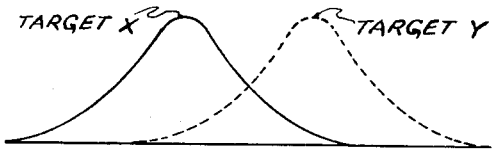
G
H
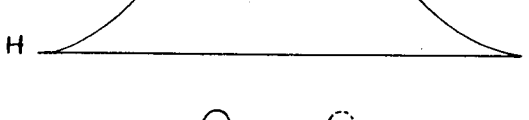
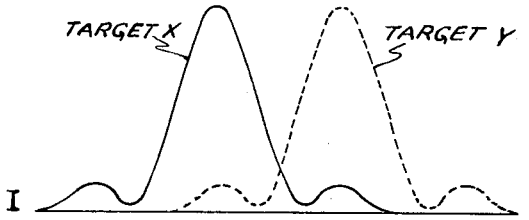
I
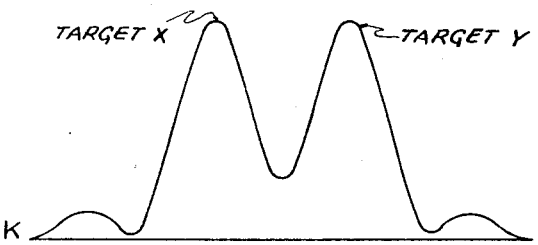
K
Inventor
SIDNEY W. LEWINTER
By Philip M. Bolton
Attorney United States Patent Office 2,999,236
Patented Sept. 5, 1961

2,999,236
HIGH RESOLUTION RADAR
Sidney W. Lewinter, Verona, N.J., assignor to International Telephone and Telegraph Corporation, Nutley, N.J., a corporation of Maryland
Filed July 18, 1958, Ser. No. 749,506
5 Claims. (Cl. 343—11)

This invention relates to radar systems for determining the bearing or bearing and range of a target and particularly to such a system having improved resolution whereby the bearings may be accurately presented on an indicating device such as a pulse position indicating (PPI) type cathode ray tube.

In the past, improved PPI-type radar systems have been employed for providing more accurate bearing information and presenting that information on a PPI display. The purpose of some of these prior systems is to increase the angular accuracy of bearing resolution to a small fraction of the radar beam width. One such prior system employs a narrow gating pulse whose center is coincident with the center of the envelope of the return radar pulses reflected by the target so that by controlling the width of said gating pulse and employing it to gate the return envelope, said envelope may be narrowed considerably giving it the appearance of improved bearing resolution, since it occupies a smaller fraction of the radar beam width. While these prior systems appear to improve bearing resolution of a single target, they do not serve to distinguish between two or more targets at the same range which both fall within one radar beam width of each other. When several such "co-range" targets occupy one radar beam width, these prior systems can produce bearing errors on a PPI display of as much as one beam width and even produce false target indications, in that one target is indicated while actually there are two or more co-range targets.

Therefore, it is the principal object of this invention to provide a radar system having improved bearing resolution.

It is another object to provide a radar system whereby a plurality of co-range targets as close as a fraction of one radar beam width apart may be discerned one from the other and the bearing of each determined.

It is another object to provide a network having a transfer function whereby the signal spectrum of the envelope of received pulses from the receiver of a pulse radar system may be altered to improve the bearing resolution of said radar system.

It is the principal feature of this invention to employ a correcting network to alter the shape of the envelope of pulses from a radar receiver in one embodiment by differentiating said envelope a plurality of times and adding the result to the original envelope, and in another embodiment by amplifying the higher frequency components of said envelope to a greater degree than the lower frequency components over a relatively wide range of frequencies and adding said amplified components to said envelope, then modulating pulses coincident with said received pulses by said corrected envelope so as to provide an envelope of received pulses having improved bearing resolution.

It is another feature to employ said correcting network to alter the envelope of received radar pulses which are fed to a PPI display to thereby improve bearing resolution.

Other and further features and objects of this invention will be more apparent from the following specific description taken in conjunction with the figures, in which:

FIG. 5 depicts numerous waveforms from which to aid understanding the operation of the system shown in FIG. 1 and the envelope correcting networks shown in FIGS. 2 and 3; and FIG. 6 depicts numerous waveforms from which to aid understanding the function of the envelope correcting network in resolving the bearings of closely spaced co-range targets.

Figure 1:
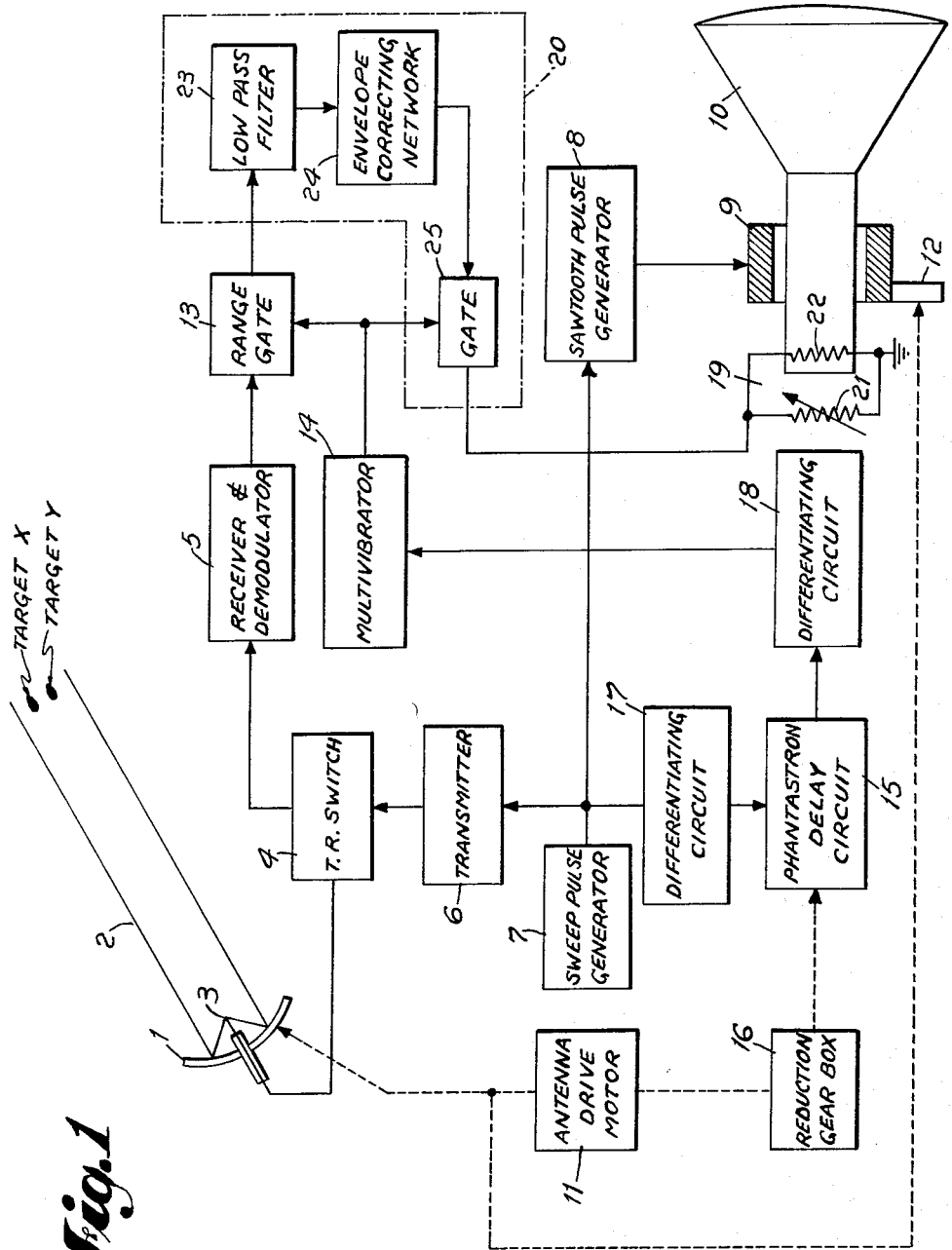
FIG. 1 depicts a block diagram of a typical PPI-type radar system having an envelope correcting network for improving bearing resolution of targets displayed on a cathode ray tube.

Turning first to FIG. 1, there is shown a typical pulse radar system for detecting the range and bearing of targets and displaying such information on a cathode ray tube (CRT) and includes a transmitting and receiving antenna 1 transmitting a narrow beam 2 and detecting reflected signals from targets, such as target X and target Y, which may be less than one radar beam width apart and at the same range. The cathode ray tube 10 is preferably a storage type device which can hold the image for the time interval needed to map the display, such as for example, a tube having a barrier grid, a writing grid and flood gun such as the "memotron" or "tonatron" manufactured by the Hughes Aircraft Company. The powered element 3 of antenna 1 is coupled via transmit and receive switch 4 to receiver and demodulator 5 and transmitter 6. Transmitter 6 is controlled by pulses from sweep pulse generator 7 which also feeds pulses to saw-tooth pulse generator 8 generating saw-tooth pulses for energizing the rotating deflection coils 9 of cathode ray tube 10. The antenna 1 is mechanically driven to sweep in bearing by antenna drive motor 11 which also drives rotating deflection coils 9 via gear 12 which is coupled to the deflection coil.

Range gate 13 is provided for gating the output of receiver and demodulator 5 so as to include only those echo pulses reflected from targets at a given range and is controlled by pulses from multivibrator 14. Multivibrator 14 is triggered by pulses derived from phantastron delay circuit 15 which produces range pulses of variable width each initiated by a pulse from sweep pulse generator 7. The variable width of pulses from circuit 15 is controlled mechanically by antenna drive motor 11 via reduction gear box 16.

Phantastron delay circuit 15 may be such as shown on page 500 of "Radar System Engineering" of the MIT Radiation Lab. Series, by Ridenour wherein the "negative trigger input," in said reference, is obtained from pulses from sweep pulse generator 7, of FIGURE 1, via differentiating circuit 17 and the mechanical input to circuit 15 shown in FIGURE 1 is applied to the "20K delay pot" shown in the reference. The output of circuit 15 hereinabove referred to as range pulses consists of negative pulses of the shape shown in the reference, each initiating in coincidence with a pulse from generator 7 and having a width related to the rotations of antenna 1 as provided by motor 11 and reduction gear box 16.

The variable width negative range pulses from circuit 15 are fed to and differentiated by circuit 18 yielding positive and negative trigger signals. The positive triggers, each of which is coincident with the trailing edge of a range pulse from phantastron circuit 15, are fed to monostable multivibrator 14 and serve to trigger that multivibrator. When triggered, multivibrator 14 produces pulses of appropriate width for energizing the intensity control of a PPI-type CRT such as CRT 10.

It is preferable that the mechanical drive to circuit 15 from antenna drive motor 11 be reduced considerably with relation to the drive to antenna 1 and the rotating deflection coils 9 of CRT 10, so that for each cycle rotation of the antenna and coil the width of the range pulses from circuit 15 changes slightly as controlled by motor 11 via reduction gear box 16. Consequently, a predetermined multitude of cycles of rotation of the antenna will cause range pulses from circuit 15 to vary in width corresponding to a band of ranges, say for example from minimum to maximum.

The output of range gate 13 consisting of envelopes of return pulses from targets at the range represented by the width of the range pulses from circuit 18, is applied to the intensity control 19 of (CRT) 10 via envelope correcting system 20. Intensity control 19 might for example consist of a variable impedance 21 shunting an impedance 22 which is internal to CRT 10 to thereby adjust the threshold level of pulse signals applied to said internal impedance required to produce an indication on the face of CRT 10.

The purpose of envelope correcting system 20 is to narrow the envelope of return pulses thereby improving bearing resolution of the target represented by said envelope of pulses and indicated on the face of CRT 10. One method of achieving this, as shown in the figure, is to feed the output of range gate 13 to low pass filter 23 serving to attenuate pulses and pass a signal representative of the envelope of the return pulses. The envelope signal from filter 23 is applied to envelope correcting network 24 having an appropriate transfer function whereby said envelope signal is made considerably more narrow and this narrowed envelope signal is fed to gate 25 and since the output pulses from multivibrator 14 are also applied to gate 25 to control said gate, the pulses from multivibrator 14 are modulated by the corrected or narrowed envelope signal from network 24. These modulated pulses appearing in the output of gate 25 are then applied to intensity control 19 of CRT 10.

Figure 2:
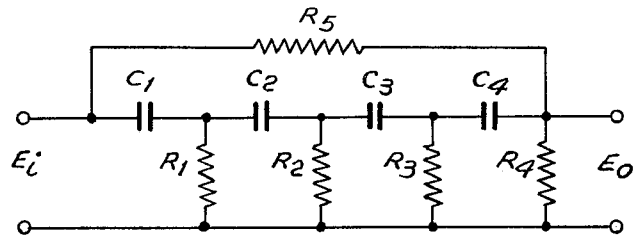
FIG. 2 is a circuit diagram showing one form of said envelope correcting network which could be employed in the system shown in FIG. 1.

The operation of envelope correcting system 20 may be understood by reference to the waveforms shown in FIG. 5. For example, an envelope of return pulses from a given target, such as target X or target Y, appearing in the output of range gate 13 might appear as shown by waveform A of FIG. 5, where α represents the position or bearing angle of the radar beam. The action of low pass filter 23 is to remove the pulses yielding an envelope waveform as shown by waveform B. One form of envelope correcting network 24, such as shown in FIG. 2, serves to differentiate waveform B four times, each differentiation yielding signals such as described by waveforms C and C', D and D' of FIG. 5, these waveforms representing the first, the second, the third and the fourth derivatives, respectively, of envelope waveform B. Subsequently, the fourth derivative, such as shown by waveform D', is added to the envelope waveform B yielding a signal such as described by waveform E. The slight delay incurred in differentiating waveform B four times before adding the result to the same waveform B, can be ignored or compensated by an initial calibration since the original envelope extends over an interval of α which is equivalent to an interval of time of large magnitude compared to the delay interval incurred by the differentiating process.

The output of gate 25 is the corrected envelope of return pulses as shown by waveform F and serves to control the intensity of the display appearing on the face of CRT 10. Variable impedance 21 is preferably adjusted to raise the threshold of CRT 10 to pulses from gate 25 to the level indicated by line 26 shown in waveform F. Consequently, the intensity control of CRT 10 is energized sufficiently to cause an image representative of the target to appear on the face of the tube during the narrow envelope of return pulses in the interval Δα (shown with waveform F) representing a considerably smaller bearing angle than the original width of the envelope of pulses represented by waveform A.

Turning next to FIG. 2, there is shown one type of envelope correcting network that could be employed in the system shown in FIG. 1. This network consists of a series of differentiating circuits each composed of a capacitance and a resistance, such as the combination $C_1 R_1$, each successively differentiating the input signal $E_i$ which is the envelope signal such as shown in waveform B so that the fourth derivative of said envelope is applied to resistor $R_4$. The voltage dividing action of $R_4$ and $R_5$ serves to apply the original envelope signal unaltered to $R_4$ also, so that the net potential drop across resistor $R_4$ represents the summation of the original envelope signal and its fourth derivative, such as shown in waveform E of FIG. 5.

Figure 3:
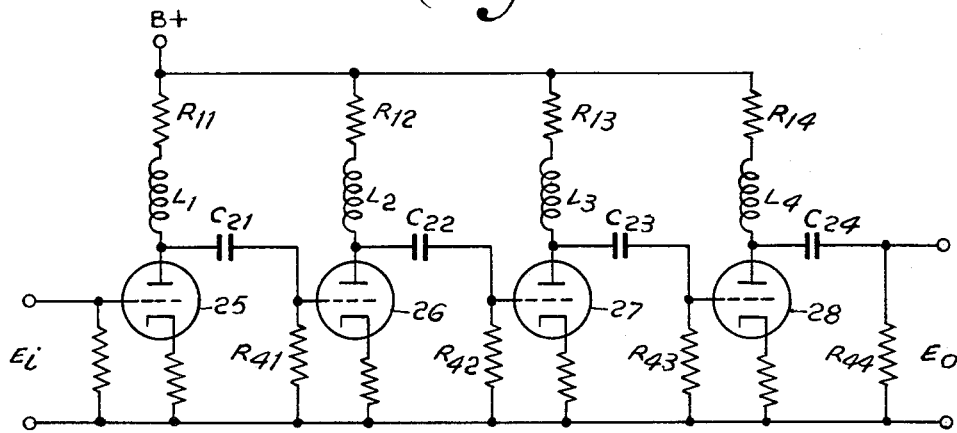
FIG. 3 is a circuit diagram of another form of said envelope correcting network which could be employed in the system shown in FIG. 1.
Figure 4:
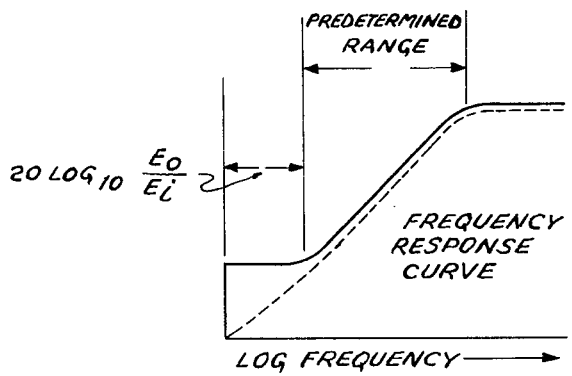
FIG. 4 shows the frequency response curve of the envelope correcting network.

Another circuit which would suffice as the envelope correcting network in FIG. 1 is shown in FIG. 3 and consists of a string of triodes coupled via large capacitances, each triode having its plate coupled to B+ via identical RL series circuits. The action of each RL circuit coupled to the plate of each triode is to cause higher frequency components of $E_i$ to be amplified to a greater degree than low frequency components. The large capacitance coupling between the plate of each stage and the grid of the next stage is such that all pertinent frequency components of $E_i$ appearing at the plate of a tube are readily transmitted from one stage to the next. For low frequency components of $E_i$, $L_1$ acts as a low impedance, thus, for these components the output of triode 25 is small and is coupled to the input of triode 26 via $R_{41}$; $C_{21}$ acting as a low impedance to these components. On the other hand, $L_1$ offers high impedance to high frequency components of $E_i$, thus, for high frequency components the output of triode 25 is large, and since $C_{21}$ offers even lower impedance to high frequencies, the output of triode 25 for these components is also applied to $R_{41}$ for controlling the next stage, triode 26. Consequently, in the above matter higher frequencies are amplified considerably more than lower frequency components of the input $E_i$ from stage to stage of the circuit shown in FIG. 3 over a predetermined band, and in such condition are impressed across $R_{44}$. Obviously, components of the circuit shown in FIG. 3 may be chosen to yield a frequency response curve, such as shown by the solid line in FIG. 4, in which frequencies are amplified over a predetermined range to a degree increasing with frequency. As is described on page 126 of "Theory of Servo Mechanisms," volume 25 of the MIT Radiation Laboratory Series, by James, Nichols and Phillips, the frequency response of a circuit such as shown in FIG. 2 with $R_5$ removed is essentially as shown by the dotted line frequency response curve of FIG. 4, wherein the sloping portion of said curve slopes at 6N db per octave, where N is the number of RC stages.

To frequency components of $E_i$ lower than said predetermined range, the circuit shown in FIG. 3 has essentially a flat response because for these very low frequency components the reactances of, for example, $L_1$ and $C_{21}$ are very low compared to $R_{11}$ and $R_{41}$, respectively.

As an example of the improvement to be gained by employing the envelope correcting network to better distinguish between two targets, such as target X and target Y shown in FIG. 1 which are less than one beam width apart and at the same range, consider the waveforms describing the envelope of return pulses from each target shown in FIG. 6. In waveforms G of FIG. 6, there is shown the envelope of return pulses from target X as a solid line and the envelope of return pulses from target Y as a dotted line. These envelopes appear at the output of range gate 13 as a composite signal such as shown by waveform H in which it can be noted there is little definition between target X and target Y. The action of envelope correcting network 24 is to add the fourth derivative of target X envelope and the fourth derivative of target Y envelope, shown in waveforms I, to the composite waveform H yielding the waveform K which is the corrected envelope appearing at the output of envelope correcting network 24. Thus, the improvement in resolution of bearing to target X and target Y accomplished by transforming a multiple target envelope of the shape shown by waveform H to an envelope of the shape shown by waveform K is obvious and upon reinsertion of pulses coincident with the echo radar pulses by the action of gate 25 and applying the resulting corrected envelope of pulses to the intensity control of CRT 10, targets X and Y will be distinguished on the face of said CRT with better definition than would be obtained had the original envelope H been employed unaltered.

While there is described above the principles of this invention in connection with specific apparatus and there is shown two different forms of an envelope correcting network, it should be understood that this description is made only by way of example and not as a limitation to the scope of the invention as set forth in the objects and the accompanying claims.

I claim:

1. In a radar system for determining and indicating the bearing and range to targets and having a radar transmitter and receiver yielding an envelope of return radar pulses, means for improving bearing resolution comprising filter means coupled to the output of said receiver for producing a signal indicative of said envelope, a circuit coupled to the output of said filter for attenuating low frequencies in said filter output to a greater degree than high frequencies, means for generating pulses coincident with said return radar pulses, gating means coupled to the output of said circuit and controlled by said coincident pulses and means coupled thereto for employing the output of said gating means to indicate the positions of said targets.

2. A device for improving resolution between envelopes of pulses including means for generating said envelopes of pulses and means for utilizing said improved envelopes of pulses comprising filter means for removing said pulses from said envelopes, a network coupled to the output of said filter means for differentiating said envelopes a plurality of times to produce a derivative and adding said derivative to the output of said filter, means coupled to said generating means for producing pulses coincident with said envelope pulses, modulating means coupled to said pulse producing means and to the output of said network whereby said coincident pulses are modulated by the output of said network for differentiating and adding, and means for applying the output of said modulating means to said utilization means.

3. A device for improving the resolution between envelopes of pulses including means for generating said envelopes of pulses and means for utilizing said improved envelopes of pulses comprising low pass filter means coupled to the output of said generating means for removing said pulses from said envelopes, a network coupled to said filter means for differentiating said envelopes and adding the result of said differentiation to said envelopes, means coupled to said generating means for producing pulses of essentially equal amplitude coincident with said envelope pulses, gating means coupled to the output of said network and controlled by said coincident pulses and means for applying the output of said gate to said utilization means.

4. In a pulse radar system for determining and indicating the bearing and range to targets having a radar transmitter and receiver, range gating means coupled to the output of said receiver, and a PPI-type display for indicating bearing and range to targets, means for improving bearing resolution comprising low pass filter means coupled to the output of said range gate for removing pulses from the envelope of return pulses yielding an envelope signal, a circuit coupled to the output of said filter for narrowing said envelope signal by attenuating low frequencies therein to a greater degree than high frequencies, means coupled to said range gating means for generating pulses coincident with received pulses, modulating means coupled to the output of said circuit and to said coincident pulse generating means whereby said coincident pulses are modulated by said narrowed envelope signal and means for applying said modulated coincident pulses to the intensity control of said PPI-type display.

5. In a pulse radar system for determining and indicating the bearing and range to targets having a radar transmitter and receiver, range gating means coupled to the output of said receiver, and a long persistence PPI-type cathode ray oscilloscope for indicating bearing and range to targets, means for improving bearing resolution comprising low pass filter means coupled to the output of said range gate for removing pulses from the envelope of return pulses yielding an envelope signal, a circuit coupled to the output of said filter for amplifying high frequency components of said envelope signal to a greater degree than low frequency components of said envelope signal producing a narrowed envelope signal, means coupled to said range gating means for generating pulses coincident with received pulses, modulating means coupled to the output of said circuit and to said coincident pulse generating means whereby said coincident pulses are modulated by said narrowed envelope signal and means for applying said modulated coincident pulses to the intensity control of said long persistence-type PPI cathode ray oscilloscope.

References Cited in the file of this patent

UNITED STATES PATENTS

| | | |
|---|---|---|
| 1,961,334 | Burton | June 5, 1934 |
| 2,161,764 | Minton | June 6, 1939 |
| 2,229,703 | Larsen | Jan. 28, 1941 |
| 2,557,869 | Gloess | June 19, 1951 |
| 2,709,805 | Dodington | May 31, 1955 |
| 2,776,369 | Woodcock | Jan. 1, 1957 |